US011486966B2

(12) United States Patent
Kim (10) Patent No.: US 11,486,966 B2
(45) Date of Patent: Nov. 1, 2022

(54) METHOD AND APPARATUS FOR TRACKING TARGET FROM RADAR SIGNAL USING ARTIFICIAL INTELLIGENCE

(71) Applicant: SMART RADAR SYSTEM, INC., Seongnam-si (KR)

(72) Inventor: Jong Il Kim, Yongin-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 775 days.

(21) Appl. No.: 16/457,898

(22) Filed: Jun. 28, 2019

(65) Prior Publication Data
US 2020/0057141 A1    Feb. 20, 2020

(30) Foreign Application Priority Data

Aug. 16, 2018 (KR) .................... 10-2018-0095289

(51) Int. Cl.
*G01S 7/41* (2006.01)
*G01S 13/72* (2006.01)
*G06N 3/08* (2006.01)
*G06N 3/04* (2006.01)

(52) U.S. Cl.
CPC ............ *G01S 7/417* (2013.01); *G01S 13/726* (2013.01); *G06N 3/0445* (2013.01); *G06N 3/08* (2013.01)

(58) Field of Classification Search
CPC ..... G01S 13/726; G01S 7/417; G06N 3/0445; G06N 3/08
See application file for complete search history.

(56) References Cited

U.S. PATENT DOCUMENTS

| 11,093,819 | B1* | 8/2021 | Li | .............................. G06N 3/08 |
| 2014/0028489 | A1* | 1/2014 | Furukawa | ................ G01S 13/44 342/95 |
| 2015/0347871 | A1* | 12/2015 | Sathyendra | ............ G06V 10/42 382/103 |
| 2017/0322300 | A1* | 11/2017 | Kageme | ................. G01S 13/582 |
| 2018/0129934 | A1* | 5/2018 | Tao | ......................... G06V 10/82 |

FOREIGN PATENT DOCUMENTS

| JP | 2017-151706 A | 8/2017 |
| KR | 10-0426928 B1 | 7/2004 |
| KR | 10-2018-0086716 A | 8/2018 |

OTHER PUBLICATIONS

Korean office action dated Jan. 21, 2020 for Korean Application No. 10-2018-0095289.

* cited by examiner

*Primary Examiner* — Timothy X Pham
(74) *Attorney, Agent, or Firm* — Insight Law Group, PLLC; Seung Lee (57) ABSTRACT

Disclosed is a technique for processing signals received from a radar and, in particular, a technique for tracking a target on the basis of detected target candidate signals. The proposed invention introduces a recurrent neural network with a memory function in order to find a target signal from signals with noise and fake signals mixed therein. This recurrent neural network is trained to have a maximum of Q tracking buffers therein. According to an additional aspect, it is possible to increase tracking accuracy through a serial connection of the recurrent neural network. According to an additional aspect, it is possible to track multiple targets through a parallel connection of the recurrent neural network.

18 Claims, 9 Drawing Sheets

METHOD AND APPARATUS FOR TRACKING TARGET FROM RADAR SIGNAL USING ARTIFICIAL INTELLIGENCE

CROSS-REFERENCE TO RELATED APPLICATION(S)

This application claims priority from Korean Patent Application No. 10-2018-0095289, filed on Aug. 16, 2018, in the Korean Intellectual Property Office, the disclosure of which is incorporated herein by reference in its entirety.

BACKGROUND

1. Field

The following description relates to a technique for processing signals received from a radar and, in particular, a technique for tracking a target on the basis of detected target candidate signals.

2. Description of Related Art

In the radar technology, a target tracking technique is a technique in which, when target candidates are detected using an algorithm such as a constant false alarm rate (CFAR) algorithm, a target is determined based on a time sequence of detected target candidate signals and then tracked along the time axis. For conventional radar target tracking techniques, algorithms such as a Kalman filter or an extended Kalman filter, a probabilistic data-association filter (PDAF), and a joint probabilistic data-association filter (JPDAF) have been used. These algorithms estimate future paths on the basis of current and past paths of an object being tracked. By correcting measured values using an estimated path and a probability distribution of actually measured data, the current values are estimated. However, noise makes accurate measurement difficult. Also, when there is a change in dynamics, velocity, acceleration, or the like of an object being tracked, the computation becomes complicated, and the probability of failure increases.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to the increasing of a success rate of radar target tracking from target candidates with noise during the target tracking.

The following description also relates to the increasing of a success rate of radar target tracking even when dynamics, velocity, and acceleration of an object being tracked change during the target tracking.

According to an aspect, the proposed invention introduces a recurrent neural network with a memory function in order to find a target signal from signals with noise and fake signals mixed therein. This recurrent neural network is trained to have a maximum of Q tracking buffers therein.

According to an additional aspect, a parameter is utilized in learning data of the recurrent neural network in order to increase tracking accuracy.

According to an additional aspect, it is possible to re-process the output of the recurrent neural network at a front stage by serially using the recurrent neural network.

According to an additional aspect, a processing window is set for a space to be tracked, and then the recurrent neural network is applied thereto. The processing window may be set to move along a target being tracked.

According to an additional aspect, it is possible to increase tracking accuracy by using a classical tracking algorithm together. In this case, it is possible to omit complicated calculation processes for extracting a real target from a plurality of targets that are essential in the classical tracking algorithm.

According to an additional aspect, when the target tracking fails, it is possible to set the processing window using target estimation information calculated through classical algorithms executed in parallel. According to another aspect, when the target tracking fails, it is possible to enlarge the processing window and retry the tracking.

According to an additional aspect, it is possible to arrange tracking circuits having the recurrent neural networks in parallel in order to track multiple targets.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above or other aspects will be implemented through embodiments described with reference to the accompanying drawings. It is to be understood that the components of each embodiment may be variously combined therein unless otherwise stated or mutually contradictory.

Figure 1:
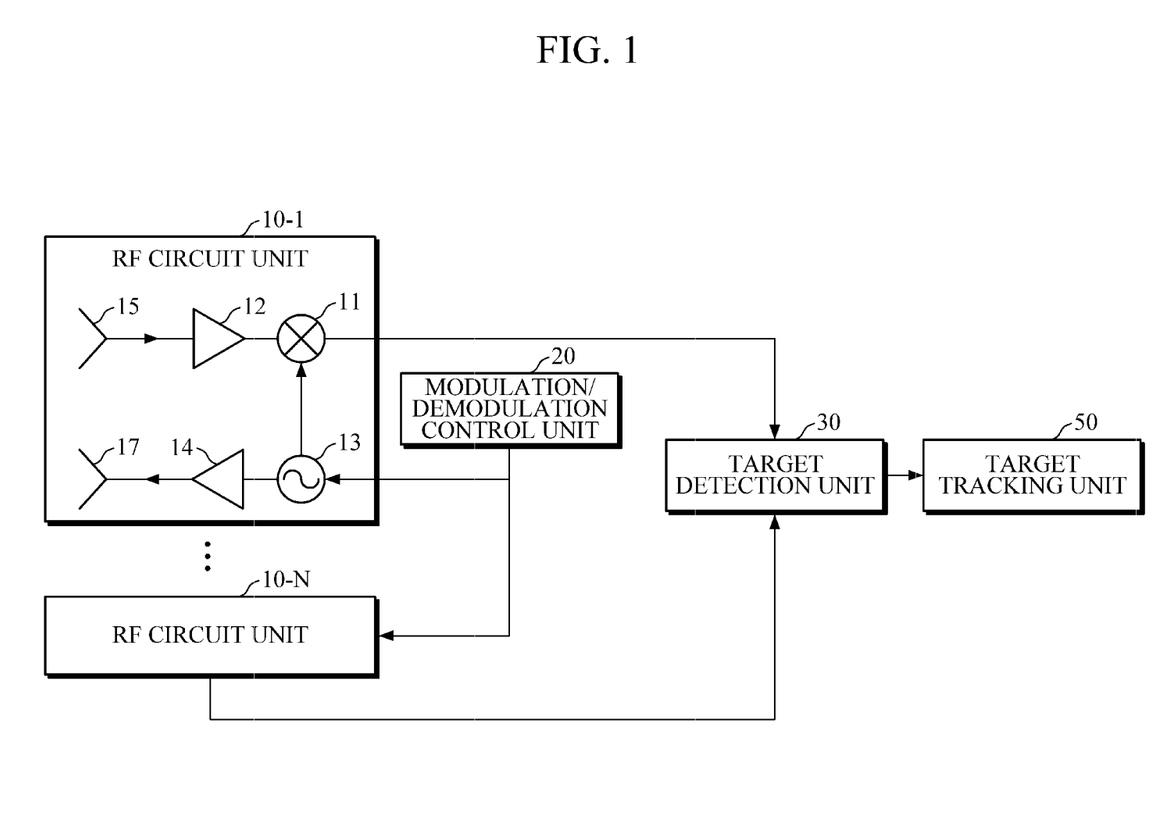
FIG. 1 is a block diagram showing an embodiment of a configuration of a radar apparatus to which a radar target tracking apparatus according to the proposed invention is applicable.

FIG. 1 is a block diagram showing an embodiment of a configuration of a radar apparatus to which a target tracking apparatus according to the proposed invention is applicable. Although a frequency-modulated continuous wave (FMCW) radar is exemplarily shown in the shown embodiment, the proposed invention may be applied to other types of radars. As shown, the FMCW radar apparatus according to an embodiment includes radio frequency (RF) circuit units 10-1, . . . , and 10-N, a modulation/demodulation control unit 20, a target detection unit 30, and a target tracking unit 50. The modulation/demodulation control unit 20 outputs a modulation and demodulation control signal for generating an FMCW radar waveform signal. The RF circuit units 10-1, . . . , and 10-N transmit FMCW radar waveform signals through an antenna, demodulate radar waveform signals received through a reception antenna, and output baseband signals. In an embodiment, a variable frequency oscillator 13 generates an FMCW radar waveform transmission signal according to a control signal of the modulation/demodulation control unit 20. As an example, the modulation/demodulation control unit 20 outputs a control signal such that the variable frequency oscillator 13 generates and outputs an FMCW radar waveform signal having a frequency linearly increasing and decreasing during a period which is called a chirp. A frequency modulation signal oscillated by the variable frequency oscillator 13 is transmitted to a transmission antenna 17 via a power amplifier 14. The FMCW radar waveform signal transmitted through the transmission antenna 17 is reflected by a target and received through a reception antenna 15.

In an embodiment, the transmission antenna 17 and the reception antenna 15 are each implemented as a micro-patch antenna. The embodiment illustrates one transmission antenna and one reception antenna for each RF circuit unit and exemplifies the case where the number of transmission antennas and the number of reception antennas are the same, but this is merely an example. Generally, the number of transmission antennas is different from the number of reception antennas. By comparing an FMCW radar waveform signal transmitted from one transmission antenna to an FMCW radar waveform signal received through one reception antenna to measure a delay value and a Doppler shift, a radial velocity of the target and a distance to the target may be measured. The radial velocity of the target and the distance to the target may be calculated for each channel configured as a pair of one transmission antenna and one reception antenna. Also, an angular displacement may be measured through multiple transmission antennas and multiple reception antennas. As is known, multi-state scan operations can increase angular position resolution.

The target detection unit 30 finds bit frequencies on the basis of radar waveform signals received through the RF circuit units 10-1, . . . , and 10-N, performs a Fourier transform on the bit frequencies two times to calculate a radial velocity of a target candidate and a distance to the target candidate in each channel, and removes noise and virtual images through a constant false alarm rate (CFAR) algorithm for example, to detect target candidates. However, the target candidates detected through the CFAR algorithm still have a significant number of virtual images or a significant amount of noise, and thus the target tracking unit 50 analyzes a history of distribution or movement of the target candidates detected by the target detection unit 30, removes the virtual images, and then determines an actual target from among the target candidates. The target tracking unit 50 may find an angular displacement, i.e., position data on the basis of target candidate signals detected for each of multiple channels. The proposed invention is associated with the target tracking unit 50.

Figure 2:
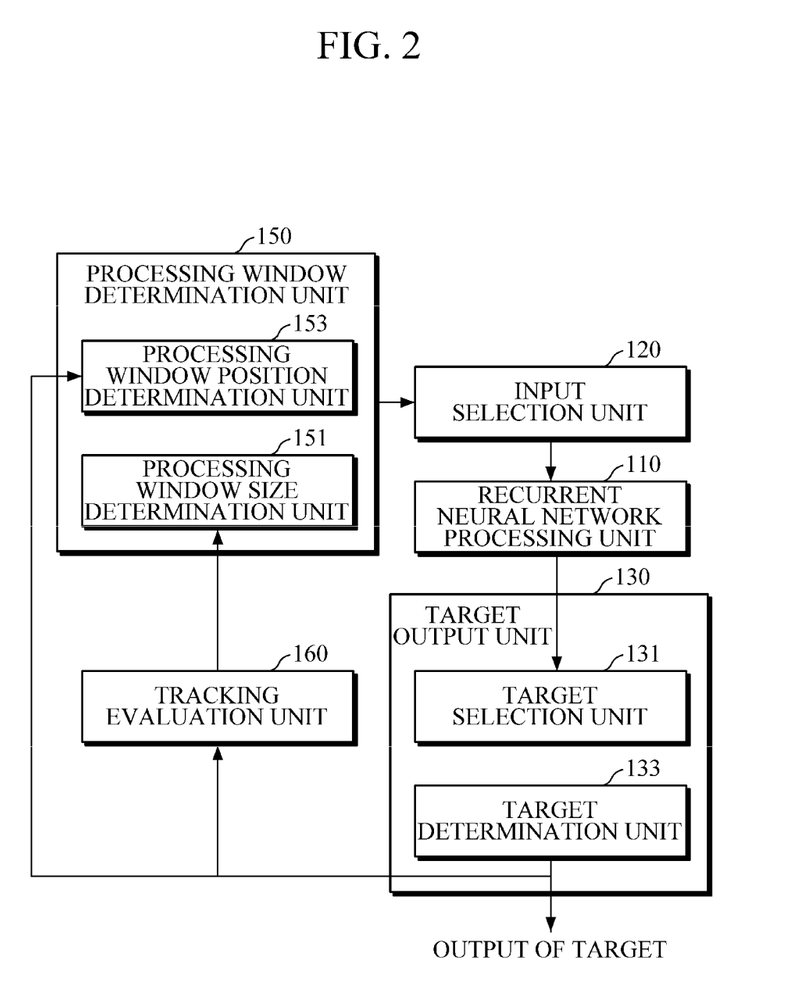
FIG. 2 is a block diagram showing a configuration of a radar target tracking apparatus according to an embodiment.

FIG. 2 is a block diagram showing a configuration of a radar target tracking apparatus according to an embodiment. In the shown embodiment, each of blocks may be implemented as a program executed by computing elements. Typically, the computing elements are configured to include one or more processors and a memory that stores programs or data executable by the processors. As an example, the memory may be composed of a non-volatile memory and a volatile memory. The processors may typically have a reconfigurable architecture that can change the configuration to suit tasks. For software implementations, one task may be implemented or a plurality of concurrently executed tasks may be implemented to exchange data with each other via a task-to-task interface. Some or all of the tasks which require high velocity may be implemented in hardware. The proposed invention is interpreted to encompass such implementation techniques. It should be logically understood that the blocks do not necessarily have to be sequentially executed although they are represented in either a flowchart or a block diagram. As described below, it may be advantageous to concurrently execute the blocks, and also it may be advantageous to sequentially execute the blocks.

As shown, the target tracking apparatus according to an embodiment includes a recurrent neural network processing unit 110 and a target output unit 130. The recurrent neural network processing unit 110 receives pointers including position information and velocity information of a maximum of N target candidates existing in a processing window and outputs M (<N) selected target candidates and target probabilities thereof. A target probability is a probability of a corresponding target candidate being a target. Here, input vectors are represented using the pointers in the sense that they include position information. An input selection unit 120 selects N target candidates being likely to be a target from among the detected target candidates existing in the processing window. When the number of target candidates in the processing window is smaller than N, the remaining inputs are set to zero. When the number of target candidates output from the target detection unit and the like in the previous stage is small, all the target candidates in the processing window may be selected. A noise target signal often appears intermittently, and the input selection unit 120 may exclude the noise target signal in consideration of an intermittent frequency. When more than N target candidates are spatially distributed, the input selection unit 120 selects N candidates on the basis of the position of the next window. In this case, the selection may be made in order of closeness to the center of the window, in order of magnitude when the magnitude of a signal is given, or in consideration of dynamic characteristics, i.e., an estimated movement trajectory for each target candidate.

The recurrent neural network processes a current input and a past state using the same parameters to calculate a next state and output. The recurrent neural network exhibits excellent performance in handwriting recognition or natural language processing because it reflects past cumulative states in the output. The proposed invention applied a recurrent neural network having a memory function in consideration of characteristics in which the tracking of a target based on a radar signal significantly depends on the history of movement, thus achieving an excellent result. Characteristically, a certain number of target candidates are selected as an input of the recurrent neural network from among the target candidates distributed in the window of a spatial range. This recurrent neural network is trained to have a maximum of Q tracking buffers therein. The proposed invention exhibited better performance when a gated recurrent unit, which may be selectively removed in a recurrent loop of the recurrent neural network, was utilized.

In an embodiment, the input of the recurrent neural network includes two-dimensional coordinates and a radial velocity. According to an additional aspect, the input of the recurrent neural network may further include parameters. For example, the parameter may be $(x^2+y^2)$ when the two-dimensional coordinates are (x, y). By using the parameter as the input, it is possible to increase the tracking speed of the recurrent neural network. As another example, the amplitude of a radar waveform signal may be employed as an additional input of the recurrent neural network, instead of the parameter.

According to an optional aspect, the input of the recurrent neural network may be a difference in two-dimensional coordinates between a final target and an input target candidate. In this case, in a training stage, the recurrent neural network is trained with a difference in two-dimensional coordinates between a final target and a target candidate by applying reinforcement learning. In an actual operation, however, the recurrent neural network has a difference in two-dimensional coordinates between a previously determined target and a current target candidate as the input. Even in this case, a parameter for the difference may be additionally included as one input. For example, the parameter may be $(\Delta x^2+\Delta y^2)$ when the difference coordinates are $(\Delta x, \Delta y)$.

The target output unit 130 receives M selected target candidates, determines a final target in consideration of target probabilities thereof, and then outputs the determined final target. For example, the target output unit 130 may select and output one target candidate that is most likely to be the target.

According to an additional aspect, the target output unit 130 may include a target selection unit 131 and a target determination unit 133. In an embodiment, the target selection unit 131 receives M selected target candidates and outputs K (<M) reselected target candidates in consideration of target probabilities thereof. For example, the target selection unit 131 may output K (<M) reselected target candidates that are likely to be the target among the M selected target candidates. In an embodiment, the target determination unit 133 determines one final target from among the K reselected target candidates and outputs the determined final target. As an example, the target determination unit 133 determines, as the final target, a target candidate that is most likely to be the target from among the K reselected target candidates.

According to an additional aspect, the radar target tracking apparatus may further include a processing window determination unit 150. The processing window determination unit 150 determines the position of the next window in consideration of the final target determined by the target determination unit 133. When a large number of target candidates are spatially distributed, the processing window may be selected as a certain region of the spatially distributed target candidates. When the processing window is selected, the number of target candidates in the window may vary. In an embodiment, the position of the next processing window is determined such that the position determined for the current target over the entire distribution of the target candidates is the center of the next processing window.

According to an additional aspect, the radar target tracking apparatus may further include a tracking evaluation unit 160. According to an aspect, the tracking evaluation unit 160 determines whether the target tracking is successful. In an embodiment, the tracking evaluation unit 160 may analyze the dynamic characteristics of a sequence of final targets that have been determined by the target output unit 130 on the time axis and may evaluate whether the current tracking is successful. That is, since a physically existing target cannot move suddenly, the movement trajectory of the target should exhibit dynamic characteristics consistent with the laws of physics. Accordingly, the position of the next final target may be approximately predicted through a sequence of final targets determined for a certain time. For example, the position coordinates and radial velocity of the current final target may be predicted on the basis of position coordinates and radial velocities of the previous 12 final targets. When the final target determined at the current time is far away from the predict target position, it may be determined that the determination of the final target has failed.

According to an additional aspect, the radar target tracking apparatus may further include a processing window size determination unit 151. In an embodiment, when the target tracking is evaluated as being successful, the radar target tracking apparatus maintains the default size as the size of the processing window. When the target tracking is evaluated as having failed, the radar target tracking apparatus enlarges the processing window beyond the default size. By enlarging the size of the processing window, a larger range of target candidates are encompassed, and the probability of returning to successful target tracking increases. For example, the enlarged processing window is 1.5 times greater in width and length than a default processing window and thus has an area which is 2.25 times larger than a default area. In the shown embodiment, when the size of the processing window increases, the input selection unit 120 selects, as an input of the recurrent neural network processing unit 110, N target candidate signals that are likely to be the target from among target candidate signals included in the enlarged processing window.

In the shown embodiment, when the target is determined by the target determination unit 133, a processing window position determination unit 153 determines the center position of the new processing window on the basis of the position of the determined target. In addition, the tracking evaluation unit 160 evaluates whether the target tracking is successful on the basis of the dynamic characteristics of the target determined by the target determination unit 133 and then determines the size of the processing window according to the evaluation result.

Figure 3:
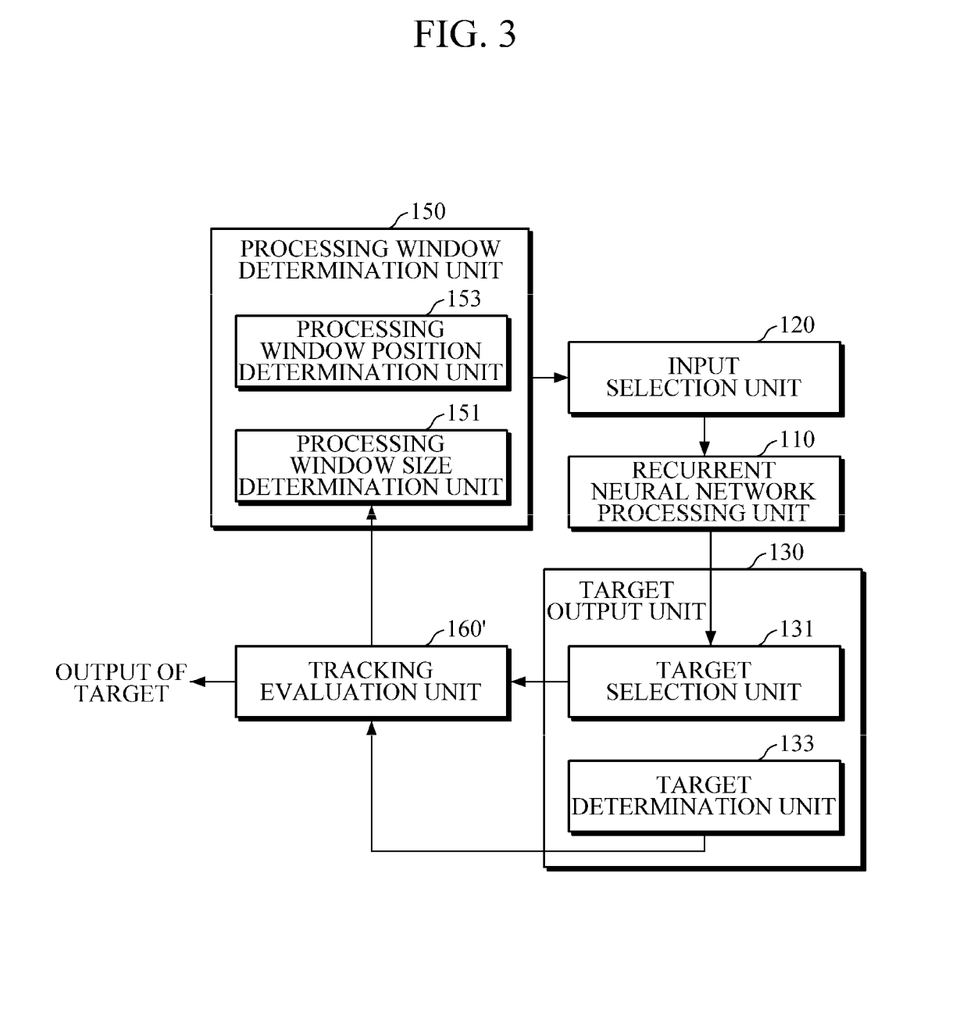
FIG. 3 is a block diagram showing a configuration of a radar target tracking apparatus according to another embodiment.

FIG. 3 is a block diagram showing a configuration of a radar target tracking apparatus according to another embodiment. Similar elements to those shown in the embodiment of FIG. 2 are referred to by the same reference numerals. The target output unit 130 determines and outputs a final target in the embodiment shown in FIG. 2, whereas a tracking evaluation unit 160' determines and outputs a final target in the embodiment shown in FIG. 3. According to an aspect, in the shown embodiment, the tracking evaluation unit 160' may analyze a change on the time axis, that is, dynamic characteristics of final targets that are finally determined by the target output unit 130 and may determine whether the tracking of the currently determined final target is successful. For example, when the target determination unit 133 selects an output that is most likely to be the target from among outputs of the target selection unit 131, a target candidate that is less likely to be the target than the selected output may be actually more suitable for the target. According to an additional aspect, the tracking evaluation unit 160' may cancel the final target determined by the target determination unit 133 in consideration of such an evaluation result. The tracking evaluation unit 160' may determine, as the final target, another target candidate consistent with dynamic characteristics from among K target candidates primarily selected by the target selection unit 131 and output the determined final target. When the target is determined by the tracking evaluation unit 160', the processing window position determination unit 153 determines the center position of the new processing window on the basis of the position of the determined target. In addition, the tracking evaluation unit 160' analyzes the dynamic characteristics from the sequence of the determined targets, evaluates whether the target tracking is successful, and determines the size of the processing window according to the evaluation result. For example, the evaluation result value may be a probability that the target tracking is successful, and the size of the processing window may be determined between the maximum size and the minimum size in consideration of the probability.

Figure 4:
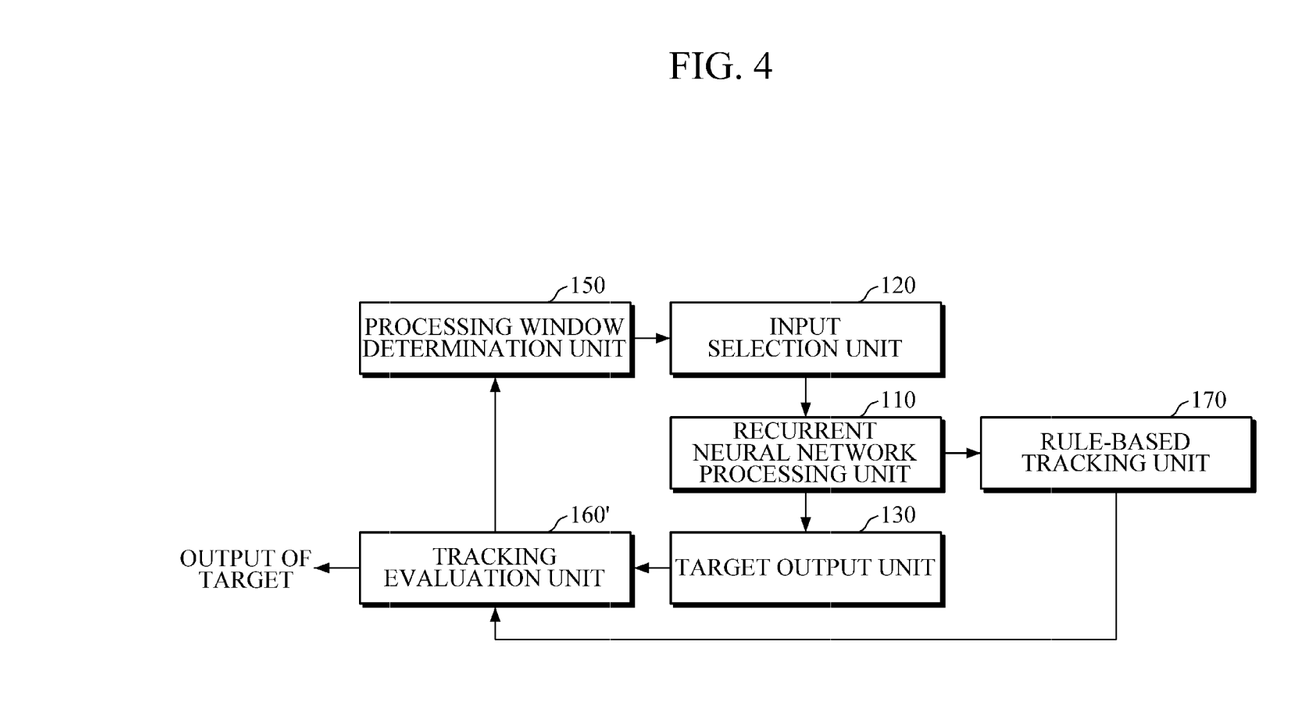
FIG. 4 is a block diagram showing a configuration of a radar target tracking apparatus according to another embodiment.

FIG. 4 is a block diagram showing a configuration of a radar target tracking apparatus according to another embodiment. As shown, the embodiment shown in FIG. 4 may further include a configuration of a rule-based tracking unit 170 compared to the embodiment shown in FIG. 3. Similar elements to those shown in the embodiment of FIG. 3 are referred to by the same reference numerals. When the tracking evaluation unit 160' determines that the target tracking has failed, the rule-based tracking unit 170 detects a target on the basis of a rule-based algorithm and outputs the target to the processing window determination unit 150 as a new target. For example, the rule-based tracking unit 170 uses an extended Kalman filter. In the shown embodiment, the rule-based tracking unit 170 operates an extended Kalman filter algorithm on the basis of the M target candidates selected by the recurrent neural network processing unit 110 and a sequence of the finally estimated target outputs in the previous stage, estimates the range of the next possible position of a target being tracked, and determines one of the M target candidates as the final target. When the tracking evaluation unit 160 determines that the target tracking has failed through the target selection unit 131, the processing window determination unit 150 determines the next processing window on the basis of the output of the rule-based tracking unit 170 instead of the output of the target selection unit 131.

Figure 5:
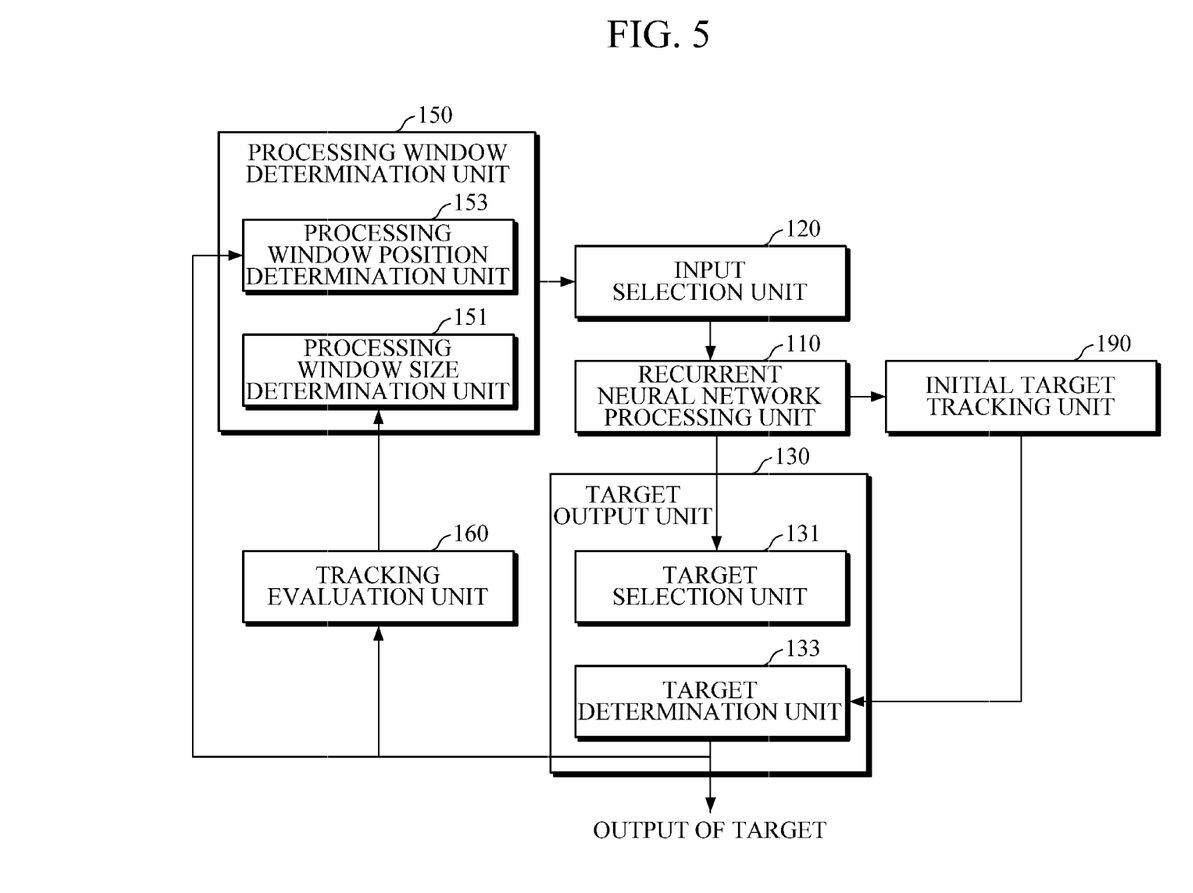
FIG. 5 is a block diagram showing a configuration of a radar target tracking apparatus according to another embodiment.

FIG. 5 is a block diagram showing a configuration of a radar target tracking apparatus according to another embodiment. As shown, the embodiment shown in FIG. 5 may further include a configuration of an initial target tracking unit 190 compared to the embodiment shown in FIG. 2. Similar elements to those shown in the embodiment of FIG. 2 are referred to by the same reference numerals. According to an aspect, the initial target tracking unit 190 tracks a target using another algorithm with a fast stabilization speed for a sequence of input sample values before the recurrent neural network processing unit 110 is sufficiently stabilized. For example, the initial target tracking unit 190 may operate on a number of input value sequences equal to the number of hidden layers of the recurrent neural network processing unit 110. As another example, the initial target tracking unit 190 may operate on a number of input value sequences smaller than the number of hidden layers of the recurrent neural network processing unit 110. According to an aspect, the initial target tracking unit 190 may determine the target on the basis of a rule-based algorithm. In the shown embodiment, the initial target tracking unit 190 is implemented with an extended Kalman filter, but the proposed aspect is not limited thereto.

In the shown embodiment, during a predetermined initial input sample period, the target determination unit 133 outputs the final target output by the initial target tracking unit 190. Subsequently, the target determination unit 133 outputs the final target determined from among the outputs of the target selection unit 131 by the target determination unit 133. However, the proposed invention is not limited thereto. For example, when this is applied to the embodiment shown in FIG. 3, this selective output may be handled by the tracking evaluation unit 160'. The selective aspects that have been described with reference to FIGS. 2 to 4 may be selectively applied to the embodiment of FIG. 6 in the same manner.

Figure 6:
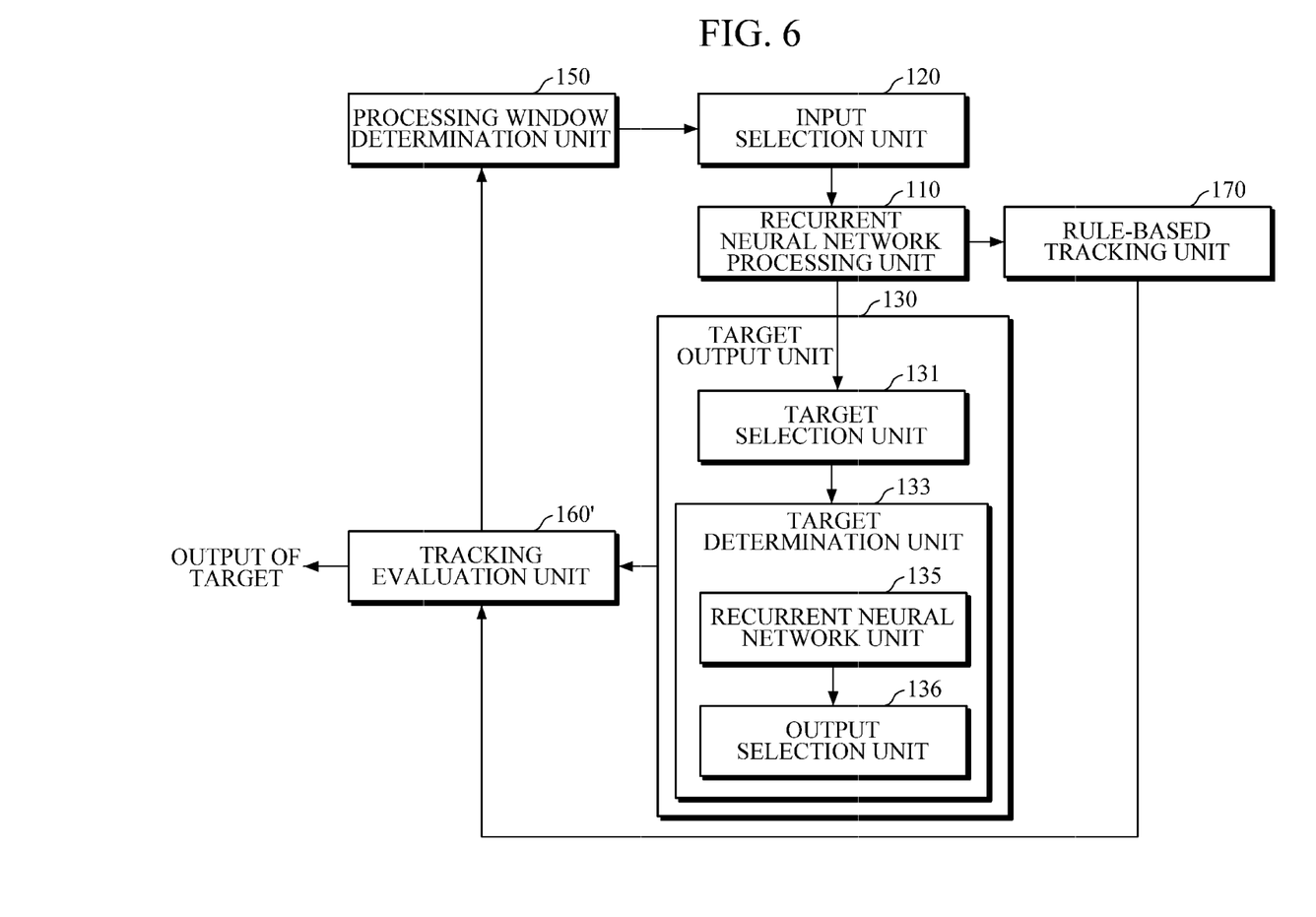
FIG. 6 is a block diagram showing a configuration of a radar target tracking apparatus according to another embodiment.

FIG. 6 is a block diagram showing a configuration of a radar target tracking apparatus according to another embodiment. As shown, in the shown embodiment, the target determination unit 133 is implemented as a recurrent neural network. In this embodiment, the recurrent neural network processes pointers including two-dimensional coordinates and speed information of the K reselected target candidates, determines one final target, and then outputs the determined final target. The recurrent neural network may be trained to have Q tracking buffers therein like the recurrent neural network processing unit 110. As another example, the recurrent neural network may be trained to have a number of tracking buffers smaller than the number of tracking buffers of the recurrent neural network processing unit 110. As another aspect, the target determination unit 133 may include a recurrent neural network unit 135 and an output selection unit 136. The recurrent neural network unit 135 outputs L target candidates and target probabilities thereof from among the K target candidates. The output selection unit 136 includes a softmax function and thus outputs a target candidate having the highest target probability among the target candidates as the final target. The softmax function is one of the well-known output functions that normalize probabilities and output a target having the highest probability. The selective aspects that have been described with reference to FIGS. 2 to 5 may be selectively applied to the embodiment of FIG. 6 in the same manner.

Figure 7:
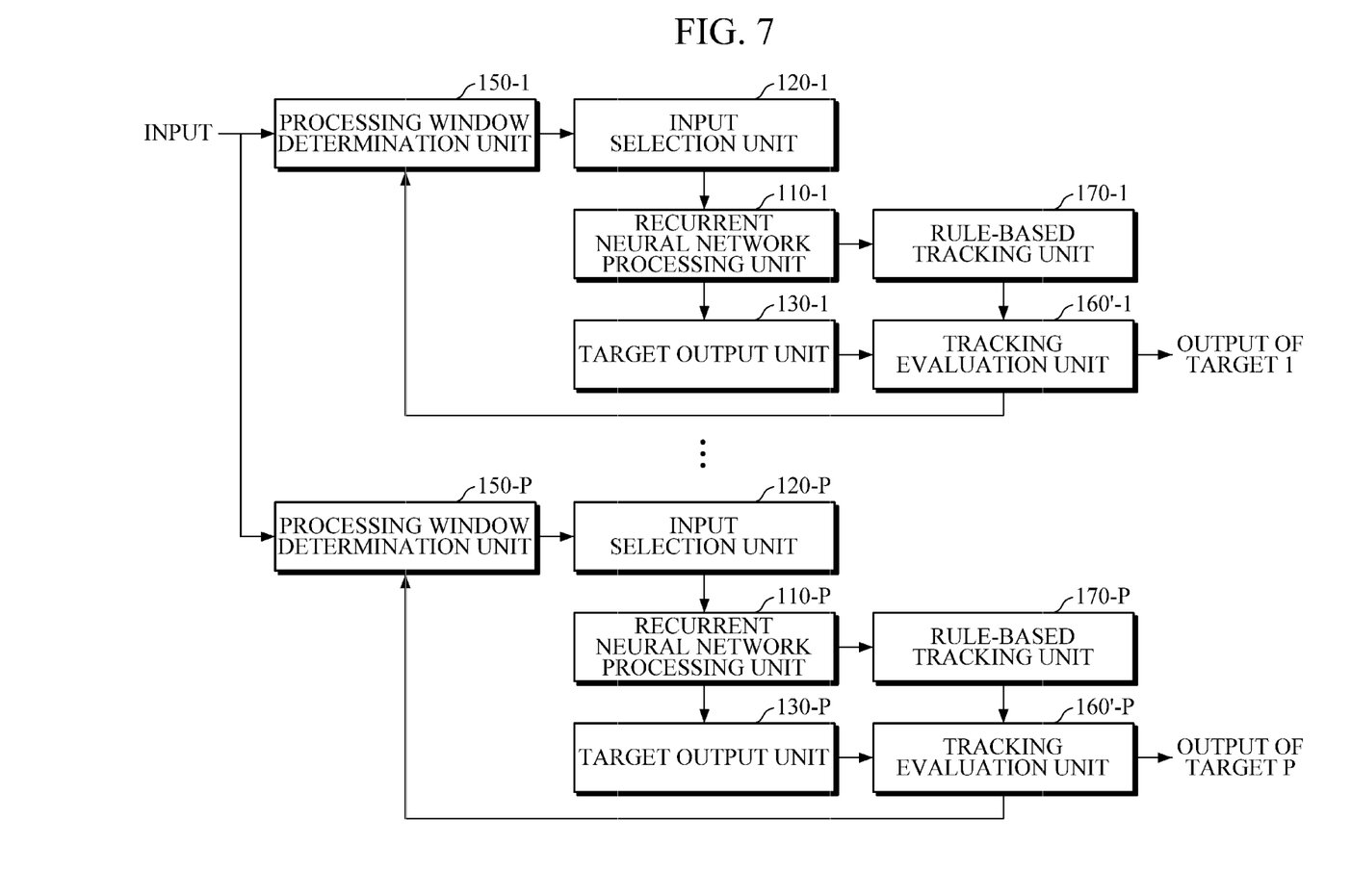
FIG. 7 is a block diagram showing a configuration of a radar target tracking apparatus according to another embodiment.

FIG. 7 is a block diagram showing a configuration of a radar target tracking apparatus according to another embodiment. As shown, the embodiment shown in FIG. 7 includes P radar target tracking apparatuses, which are identical to the radar target tracking apparatus according to the embodiment shown in FIG. 3, arranged in parallel. However, the proposed invention is not limited thereto and may be applied to various embodiments in which the aforementioned selective aspects or obvious selective aspects are combined, as well as to a configuration including P target tracking apparatuses, which are identical to the target tracking apparatus according to one of the embodiments shown in FIGS. 2 and 4 to 6. Through such a structure, it is possible to concurrently track a maximum of P targets on the basis of one input target candidate. According to such an additional aspect, the radar target tracking apparatuses have a plurality of recurrent neural network processing units 110-1, . . . , and 110-P and a plurality of corresponding target output units 130-1, . . . , and 130-P. The pairs of the recurrent neural network processing units and the corresponding target output units are controlled to track different targets. Depending on moving lines of the targets, processing windows may be set to partially overlap each other during tracking.

Figure 8:
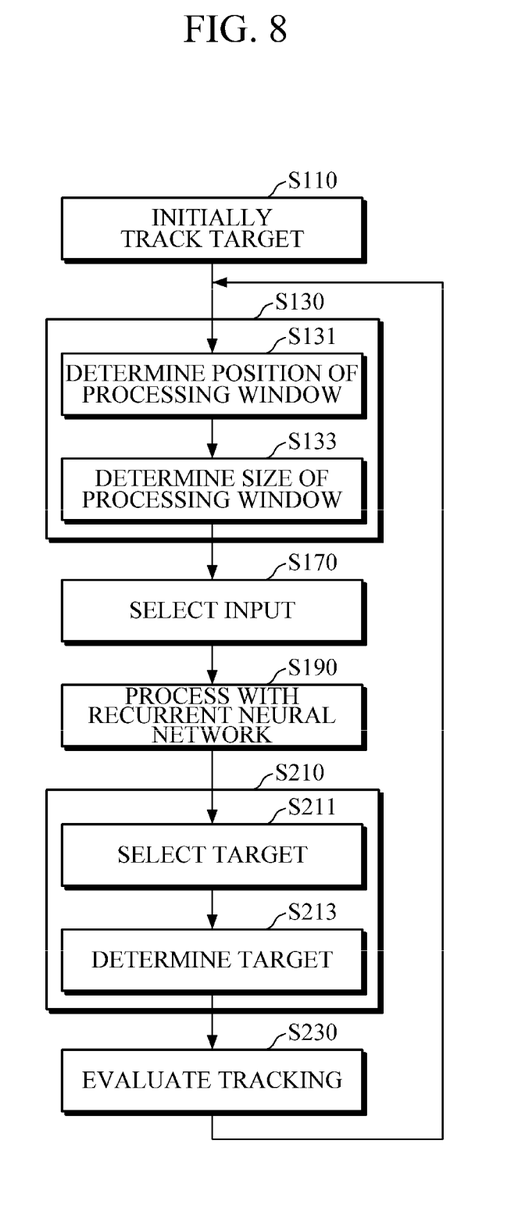
FIG. 8 is a flowchart illustrating a radar target tracking method according to an embodiment.

FIG. 8 is a flowchart illustrating a radar target tracking method according to an embodiment. According to an aspect, the radar target tracking method includes a recurrent neural network processing operation S190 and a target output operation S210. First, in the recurrent neural network processing operation S190, pointers including position information and speed information of a maximum of N target candidates existing in a processing window are processed with a recurrent neural network, and thus M (<N) selected target candidates and target probabilities thereof are output. Subsequently, in the target output operation S210, the M selected target candidates are received, and a final target is determined and output in consideration of the target probabilities. These operations are similar to those described above with reference to FIG. 2.

According to an additional aspect, position information of pointers included in an input vector may be a difference between two-dimensional coordinates of a target and two-dimensional coordinates of each pointer. According to an additional aspect, the points may further include a parameter that is found from the two-dimensional coordinates. As described above, the parameter may be two-dimensional coordinates or the size of a difference vector thereof. This aspect is also similar to that described above with reference to FIG. 2

According to an additional aspect, the target output operation S210 may include a target selection operation S211 and a target determination operation S213. In the target selection operation S211, the M selected target candidates are received, and then K (<M) reselected target candidates are output in consideration of target probabilities thereof. In the target determination operation S213, one final target is determined from among the K reselected target candidates. According to an additional aspect, in the target determination operation S213, pointers including position information and speed information of the K reselected target candidates are processed with the recurrent neural network so that one final target may be determined. The details of the target output operation S210 are similar to those described with reference to FIG. 2, 3, 5, or 6.

According to an additional aspect, the radar target tracking method may further include a processing window determination operation S130. In the processing window determination operation S130, the next processing window is determined in consideration of the final target determined in the target output operation S210. According to an aspect, the processing window determination operation S130 may include a processing window position determination operation S131 in which the next processing window is determined in consideration of the final target determined in the target output operation S210. In an embodiment, the position of the processing window may be determined such that the final target is positioned at the center of the window. As another example, the position of the processing window may be determined to be biased in a future moving direction that is estimated in consideration of the dynamic characteristics of the final target.

According to an additional aspect, the radar target tracking method may further include a tracking evaluation operation S230. In the tracking evaluation operation S230, whether target tracking is successful is determined. According to an additional aspect, the radar target tracking method may further include a processing window size determination operation S133 in which an enlarged size is applied to the next processing window when it is determined in the tracking evaluation operation that the target tracking has failed and a normal size is applied to the next processing window when it is determined that the target tracking is successful. When the tracking is successful after the processing window is enlarged, the size of the processing window is returned to the normal size. The details of the tracking evaluation operation S230 and the processing window size determination operation S133 are similar to those described with reference to FIGS. 2 to 5.

According to an additional aspect, in the tracking evaluation operation S230, when it is determined that the tracking of the currently determined final target has failed, the final target determined in the target output operation S210 may be discarded and a new target consistent with the dynamic characteristics of final targets that have been previously determined may be selected from among the target candidates and then may be output as a new final target. In this case, the position of the processing window may be determined according to the newly determined final target.

According to an additional aspect, the radar target tracking method may further include an initial tracking operation S110. As described above with reference to FIG. 5, the initial tracking operation S110 may be repeated a number of times equal to the number of sample sequences determined with reference to the depth of an internal hidden layer of the recurrent neural network processing operation S190 and performed using extended Kalman filter. During this initial period, the position of the processing window may be determined from the result of the initial tracking operation S110.

Figure 9:
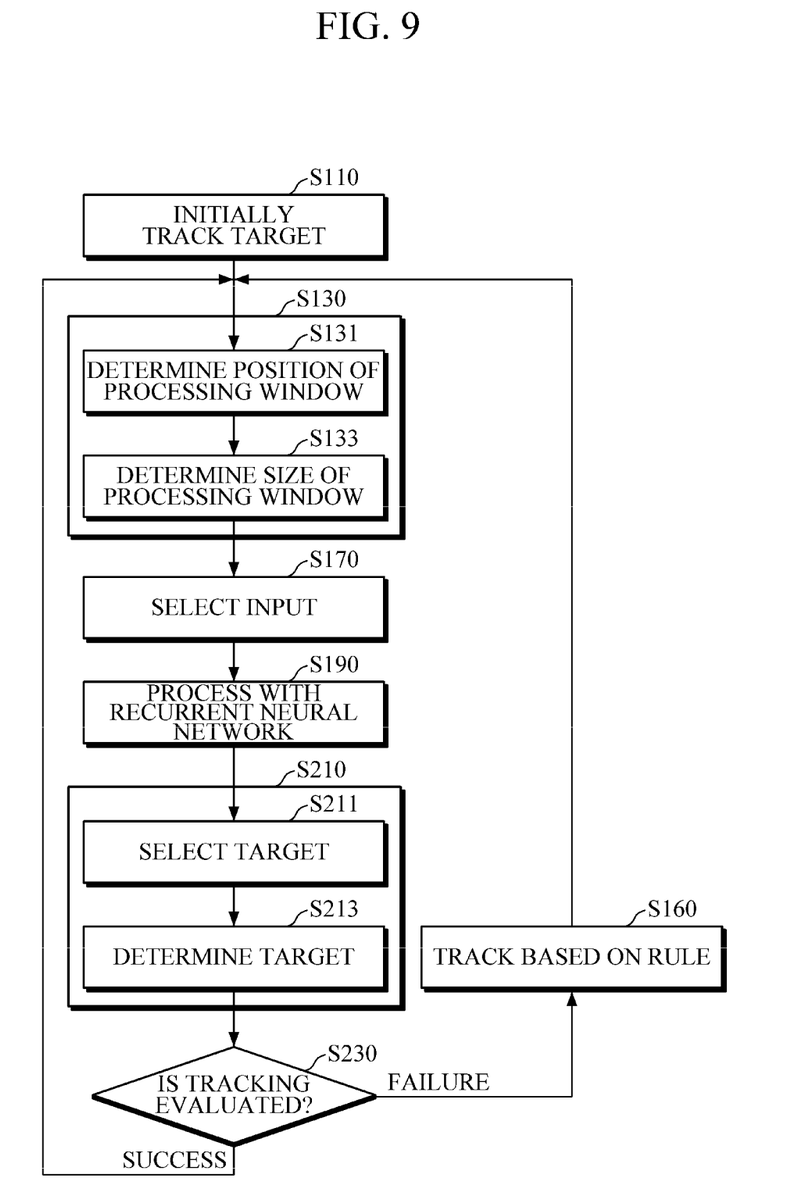
FIG. 9 is a flowchart illustrating a radar target tracking method according to another embodiment.

FIG. 9 is a flowchart illustrating a radar target tracking method according to another embodiment. In the shown embodiment, a rule-based tracking operation S160 is additionally included. According to an additional aspect, in the rule-based tracking operation S160, when it is determined in the tracking evaluation operation S230 that the target tracking has failed, the position of the next processing window is determined based on a target detected based on a rule-based algorithm. In the processing window position determination operation S131, the position of the processing window is determined based on the position of the target determined in the target output operation S210 when it is determined in the tracking evaluation operation S230 that the tracking is successful and based on the position of the target determined in the rule-based tracking operation S160 when it is determined that the tracking has failed. For example, the processing window may be determined such that the determined target is positioned at the center of the processing window.

In summary, when it is determined in the tracking evaluation operation S230 that the tracking of the target determined in the target output operation S210 is successful, the position of the processing window is determined in the processing window position determination operation S131 on the basis of the position of the target determined in the target output operation S210, and the processing window with the normal size is selected in the processing window size determination operation S133. Also, when it is determined in the tracking evaluation operation S230 that the tracking of the target determined in the target output operation S210 has failed, the target calculated in the rule-based tracking operation S160, instead of the target determined in the target output operation S210, is selected as a final target. A rule-based tracking routine is continuously executed in parallel with a routine corresponding to the recurrent neural network processing operation S190 and the target output operation S210, and the final target is selected through one of the two routines depending on the evaluation result of the tracking evaluation operation S230.

In this case, the position of the processing window is determined in the processing window position determination operation S131 on the basis of the position of the target calculated in the rule-based tracking operation S160, and a processing window enlarged beyond the normal size is selected in the processing window size determination operation S133. The details of the rule-based tracking operation S160 are similar to those described above with reference to FIG. 4.

According to an additional aspect, a plurality of such radar target tracking methods according to the proposed invention may be performed in parallel. The radar target tracking methods performed in parallel are used to track different targets. A plurality of target candidates that are likely to be an actual target are initially selected, and tasks corresponding to the target tracking methods according to the proposed invention are performed on the selected targets.

According to the proposed invention, it is possible to increase a success rate when a target is tracked from radar signals with noise and fake signals mixed therein.

Also, it is possible to increase training efficiency of a recurrent neural network by appropriately selecting an input vector of the recurrent neural network.

Also, it is possible to track multiple targets by using recurrent neural networks trained in the same manner in parallel.

Also, it is possible to quickly stabilize target tracking performance by using a classical algorithm before the recurrent neural network is stabilized at the initial stage of the target tracking.

The present invention has been described above with reference to embodiments referring to the accompanying drawings, but is not limited thereto. Rather, the present invention should be construed as encompassing various modifications that may be apparent to those skilled in the art. The following claims are intended to cover the modifications.

What is claimed is:

1. A method of tracking a radar target performed by an apparatus for tracking a radar target, the method comprising:
    a recurrent neural network processing operation in which pointers including position information and speed information of a maximum of N target candidates existing in a processing window are processed with a recurrent neural network and M (<N) selected target candidates and target probabilities thereof are output; and
    a target output operation in which the M selected target candidates are received and a final target is determined and output in consideration of the target probabilities,
    wherein the target output operation comprises:
        a target selection operation in which the M selected target candidates are received and K (<M) reselected target candidates are output in consideration of the target probabilities; and
        a target determination operation in which one final target is determined from among the K reselected target candidates.

2. The method of claim 1, wherein the position information of each of the pointers is a difference between two-dimensional coordinates of the corresponding pointer and two-dimensional coordinates of the target.

3. The method of claim 1, wherein the pointers further include a parameter found from two-dimensional coordinates.

4. The method of claim 1, wherein in the target determination operation, pointers including position information and speed information of the K reselected target candidates are processed with the recurrent neural network to determine one final target.

5. The method of claim 1, further comprising a processing window determination operation in which a next processing window is determined in consideration of the final target selected in the target determination operation.

6. The method of claim 1, further comprising a tracking evaluation operation in which it is determined whether target tracking is successful.

7. The method of claim 6, further comprising a processing window enlargement operation in which, when it is determined in the tracking evaluation operation that the target tracking has failed, a next processing window is enlarged.

8. The method of claim 6, further comprising a rule-based tracking operation in which, when it is determined in the tracking evaluation operation that the target tracking has failed, a position of a next processing window is determined based on a target detected based on a rule-based algorithm.

9. The method of claim 1, further comprising:
    an initial tracking operation in which the target is determined based on a rule-based algorithm with respect to an initial input of the pointers; and
    an initial processing window determination operation in which an initial position of the processing window is determined based on the determined target.

10. The method of claim 1, further comprising:
    a second recurrent neural network processing operation in which pointers including position information and speed information of a maximum of N target candidates existing in another processing window are processed with another recurrent neural network and M (<N) selected target candidates and target probabilities thereof are output; and
    a second target selection operation in which the M selected target candidates are received and K selected target candidates are output in consideration of the target probabilities.

11. An apparatus for tracking a radar target, the apparatus comprising:
    a recurrent neural network processing unit configured to receive pointers including position information and speed information of a maximum of N target candidates existing in a processing window and output M (<N) selected target candidates and target probabilities thereof; and
    a target output unit configured to receive the M selected target candidates and determine and output a final target in consideration of the target probabilities,
    wherein the target output unit comprises:
        a target selection unit configured to receive the M selected target candidates and output K (<M) reselected target candidates in consideration of the target probabilities; and
        a target determination unit configured to determine one final target from among the K reselected target candidates.

12. The apparatus of claim 11, wherein the target determination unit comprises a recurrent neural network configured to process pointers including speed information and two-dimensional coordinates of the K reselected target candidates and determine and output one final target.

13. The apparatus of claim 11, further comprising a processing window determination unit configured to determine a next processing window in consideration of the final target determined by the target determination unit.

14. The apparatus of claim 11, further comprising a tracking evaluation unit configured to evaluate whether target tracking of the target output unit is successful.

15. The apparatus of claim 14, further comprising a processing window size determination unit configured to determine a size of a next processing window according to a result of the tracking evaluation unit evaluating whether the target tracking is successful.

16. The apparatus of claim 11, further comprising an initial target tracking unit configured to determine and output the target on the basis of a rule-based algorithm with respect to initial input sample values.

17. The apparatus of claim 11, further comprising a plurality of recurrent neural network processing units, which is identical to the recurrent neural network processing unit, and a plurality of target selection units corresponding to the recurrent neural network processing units, wherein pairs of the recurrent neural network processing units and the corresponding target selection units track different targets.

18. An apparatus for tracking a radar target, the apparatus comprising:

a recurrent neural network processing unit configured to receive pointers including position information and speed information of a maximum of N target candidates existing in a processing window and output M (<N) selected target candidates and target probabilities thereof;

a target output unit configured to receive the M selected target candidates and determine and output a final target in consideration of the target probabilities; and a rule-based tracking unit configured to detect a target on the basis of a rule-based algorithm and output the detected target to the target determination unit; and a tracking evaluation unit configured to evaluate whether tracking of the final target currently determined by the target output unit is successful on the basis of dynamic characteristics of a target sequence that has been determined by the target determination unit, output a result of the evaluation, and output the output of the rule-based tracking unit as a final target when it is determined that the tracking has failed.

* * * * *